United States Patent
Wang et al.

(10) Patent No.: US 12,414,626 B2
(45) Date of Patent: Sep. 16, 2025

(54) QUICK-ASSEMBLY TABLE FRAME

(71) Applicant: Shaoxing Naite Drive Technology Co., Ltd., Zhejiang (CN)

(72) Inventors: Jianfeng Wang, Zhejiang (CN); Gang Ru, Zhejiang (CN); Feng Guo, Zhejiang (CN); Zhedong Zhang, Zhejiang (CN); Yongjiang Pan, Zhejiang (CN)

(73) Assignee: Shaoxing Naite Drive Technology Co., Ltd., Zhejiang (CN)

( * ) Notice: Subject to any disclaimer, the term of this patent is extended or adjusted under 35 U.S.C. 154(b) by 234 days.

(21) Appl. No.: 18/362,495

(22) Filed: Jul. 31, 2023

(65) Prior Publication Data

US 2024/0423357 A1    Dec. 26, 2024

(30) Foreign Application Priority Data

Jun. 21, 2023  (CN) .......................... 202321604285.0

(51) Int. Cl.
*A47B 13/02*    (2006.01)
*F16B 12/44*    (2006.01)

(52) U.S. Cl.
CPC .............. *A47B 13/02* (2013.01); *F16B 12/44* (2013.01); *F16B 2012/446* (2013.01)

(58) Field of Classification Search
CPC .. A47B 13/02; A47B 1/08; A47B 9/20; A47B 9/04; A47B 9/06; A47B 21/02;
(Continued)

(56) References Cited

U.S. PATENT DOCUMENTS

| | | | |
|---|---|---|---|
| 10,349,737 B2 * | 7/2019 | Keller | A47B 3/0812 |
| 11,771,216 B2 * | 10/2023 | Ergun | A47B 3/06 108/156 |

(Continued)

FOREIGN PATENT DOCUMENTS

| | | | | |
|---|---|---|---|---|
| CN | 106617677 A | * | 5/2017 | A47B 13/021 |
| CN | 107981540 A | * | 5/2018 | A47B 13/02 |

(Continued)

OTHER PUBLICATIONS

English abstract and claims of CN106617677 (Year: 2017).*
CN214432598 English translation (Year: 2021).*
CN115530521 English translation (Year: 2022).*

*Primary Examiner* — Janet M Wilkens
(74) *Attorney, Agent, or Firm* — Sughrue Mion, PLLC

(57) ABSTRACT

A quick-assembly table frame comprises: pillars, drive boxes being disposed at tops of the pillars, and table bases being connected to bottoms of the pillars; a rack connected to the drive boxes; and side plates connected to two sides of the rack and configured to install a table board. Mounting blocks are disposed in the drive boxes, mounting grooves are correspondingly formed in an inner side of the rack, control members are disposed in the drive boxes, and the control members control the mounting blocks to rotate to be limited in the mounting grooves, such that the pillars are detachably connected to the rack. The mounting blocks and the control members are disposed in the drive boxes, the control members stretch out of the drive boxes, the mounting grooves are correspondingly formed in the rack, and when the rack and the pillars are assembled, the control members control the mounting blocks to be limited in the mounting grooves, such that the rack and the drive boxes are fixedly connected, the drive boxes and the pillars are fixedly connected, and thus, the pillars and the rack are fixedly connected. A fixing (Continued)

method based on bolted connection is replaced, assembly and disassembly are easy, and labor and time are saved.

8 Claims, 5 Drawing Sheets

(58) Field of Classification Search
CPC .... A47B 2200/0051; A47B 2200/0056; A47B 2200/0054; A47B 2200/0058; A47B 2009/065; A47B 13/021; A47B 13/022; F16B 12/44; F16B 2012/446
USPC ........... 108/156, 147, 144.11, 20; 248/188.2, 248/188.5
See application file for complete search history.

(56) References Cited

U.S. PATENT DOCUMENTS

| | | | | |
|---|---|---|---|---|
| 2016/0037904 A1* | 2/2016 | Wu | ............ | A47B 3/002 248/550 |
| 2017/0135466 A1* | 5/2017 | Randløv | ............ | A47B 9/04 |
| 2020/0154881 A1* | 5/2020 | Applegate | ............ | A47B 3/0815 |
| 2020/0359785 A1* | 11/2020 | Lu | ............ | A47B 9/00 |

FOREIGN PATENT DOCUMENTS

| | | | | | |
|---|---|---|---|---|---|
| CN | 108783887 A | * | 11/2018 | ............ | A47B 13/02 |
| CN | 110051114 A | * | 7/2019 | ............ | A47B 13/02 |
| CN | 209403947 U | * | 9/2019 | ............ | A47B 13/02 |
| CN | 209705021 U | | 11/2019 | | |
| CN | 111265005 A | | 6/2020 | | |
| CN | 111920184 A | * | 11/2020 | ............ | A47B 13/02 |
| CN | 112471746 A | * | 3/2021 | ............ | A47B 13/003 |
| CN | 112603020 A | * | 4/2021 | ............ | A47B 13/00 |
| CN | 213215839 U | | 5/2021 | | |
| CN | 214432598 U | * | 10/2021 | ............ | A47B 13/003 |
| CN | 214855056 U | * | 11/2021 | ............ | A47B 13/00 |
| CN | 214905393 U | | 11/2021 | | |
| CN | 215014471 U | | 12/2021 | | |
| CN | 215470932 U | | 1/2022 | | |
| CN | 215685539 U | | 2/2022 | | |
| CN | 114931276 A | | 8/2022 | | |
| CN | 218551691 U | | 3/2023 | | |
| CN | 108783887 B | * | 11/2023 | ............ | A47B 13/02 |

\* cited by examiner

QUICK-ASSEMBLY TABLE FRAME

BACKGROUND OF THE INVENTION

1. Technical Field

The invention belongs to the technical field of adjustable tables, and particularly relates to a quick-assembly table frame.

2. Description of Related Art

Adjustable tables are tables with an adjustable height. The table frame structure of most existing adjustable tables is connected and assembled with screws, and the adjustable tables are disassembled to facilitate transport and have to be assembled by users themselves or installation personnel, which is time-consuming and labor-consuming and makes assembly and disassembly inconvenient.

An existing patent (Publication No. CN218551691U) discloses a quick-assembly table frame, which is assembled in such a manner that steel tube beams are aligned with mortise and tenon structures of steel tube connectors, and screw rods penetrate through preformed holes in surfaces of the steel tube connectors and surfaces of the steel tube beams from underneath to be fixed on screw nuts and are then tightened. However, such a quick-assembly table frame also has the abovementioned technical problems.

BRIEF SUMMARY OF THE INVENTION

The objective of the invention is to solve the above technical problems in the prior art by providing a quick-assembly table frame, which is designed in such a manner that mounting blocks and control members are disposed in drive boxes, the control members stretch out of the drive boxes, mounting grooves are correspondingly formed in a rack, and when the rack and pillars are assembled, the control members control mounting blocks to be limited in the mounting grooves, such that the rack and the drive boxes are fixedly connected, the drive boxes and the pillars are fixedly connected, and thus, the pillars and the rack are fixedly connected.

To solve the abovementioned technical problems, the invention adopts the following technical solution:

Further, a quick-assembly table frame comprises: pillars, drive boxes being disposed at tops of the pillars, and table bases being connected to bottoms of the pillars; a rack connected to the drive boxes; and side plates connected to two sides of the rack and configured to install a table board; wherein, mounting blocks are disposed in the drive boxes, mounting grooves are correspondingly formed in an inner side of the rack, control members are disposed in the drive boxes, and the control members control the mounting blocks to rotate to be limited in the mounting grooves, such that the pillars are detachably connected to the rack. In the invention, the mounting blocks and the control members are disposed in the drive boxes, the control members stretch out of the drive boxes, the mounting grooves are correspondingly formed in the rack, and when the rack and the pillars are assembled, the control members control the mounting blocks to be limited in the mounting grooves, such that the rack and the drive boxes are fixedly connected, the drive boxes and the pillars are fixedly connected, and thus, the pillars and the rack are fixedly connected.

Further, the control members adopt drive handles, the drive boxes are fixedly connected to mounting frames, the mounting frames are rotatably connected to rotary shafts, the mounting blocks are fixedly connected to two sides of the rotary shafts respectively, each of the drive handles has an end fixedly connected to the mounting block on one side of the corresponding rotary shaft, as well as an end penetrating through the corresponding drive box, limiting blocks matched with the mounting blocks are disposed in the mounting grooves, and the mounting blocks on two sides of the rotary shafts are controlled to swing by rotating the drive handles, and cooperate with the limiting blocks to detachably connect the drive boxes to the rack. The drive handles control the mounting blocks on one side of the rotary shafts to rotate and drive the mounting blocks on the other side of the rotary shafts to rotate through the rotary shafts, the limiting blocks disposed in the two mounting grooves are opposite in direction, and when each of the drive handles drives the two corresponding mounting blocks to rotate, the two corresponding mounting blocks rotate in opposite directions, such that the two corresponding mounting blocks are separated from the corresponding limiting blocks or limited in the corresponding mounting grooves at the same time.

Further, connecting poles are disposed in the drive boxes, springs are disposed between the connecting poles and the mounting blocks on the other side of the rotary shafts, hook grooves are formed in ends of the connecting poles, connecting holes are formed in the mounting blocks on the other side of the rotary shafts, and each of the springs has an end hooked in the corresponding hook groove, as well as an end hooked in the corresponding connecting hole. Through the arrangement of the springs, the mounting blocks can return automatically under the action of the spring after being controlled by the drive handles to rotate.

Further, positioning pins and guide pins are disposed on two sides of the drive boxes respectively, the positioning pins are located between the mounting blocks and the guide pins, positioning grooves are formed in the inner side of the rack corresponding to the positioning pins, guide grooves are formed in the inner side of the rack corresponding to the guide pins, and the guide grooves are arc-shaped grooves which incline downwards, away from the positioning grooves. In the assembly process of the drive boxes, the guide pins are placed in the guide grooves and controlled to slide into bottoms of the guide grooves, such that the guide pins are limited in the guide grooves; then, the positioning pins are placed in the positioning grooves, and the mounting blocks are limited in the mounting grooves, such that the drive boxes are fixed on the rack. When drive boxes need to be disassembled, the drive handles control the mounting blocks to rotate, such that the mounting blocks on the two sides of the rotary shafts are synchronously separated from the limiting blocks, the mounting blocks are taken out of the mounting grooves, the positioning pins are taken out of the positioning grooves, and finally, the guide pins are taken out of the guide grooves, such that the drive boxes are detached from the rack.

Further, hook blocks are disposed at the bottoms of the pillars, limiting through-holes allowing the hook blocks to penetrate therethrough are formed in the table bases, limiting assemblies are disposed between the pillars and the table bases, and the limiting assemblies are used for restraining the hook blocks from designating from the limiting through-holes at will.

Further, each of the limiting assemblies comprises a hasp disposed at a bottom of the corresponding table base and a limiting pin disposed at the bottom of the corresponding pillar, and fixing through-holes allowing the limiting pins to penetrate therethrough are formed in the table bases. During assembly, the limiting pins penetrate through the fixing through-holes and the hook blocks penetrate through the limiting through-holes; then, handles of the hasps are rotated backwards to allow hasp rings to sleeve the limiting pins, and then the hasp rings pull the limiting pins upwards in the horizontal direction to make the hook blocks hook bottom surfaces of the table bases, such that the limiting pins cannot disengage from the fixing through-holes at will in the vertical direction, and the table bases are limited at the bottoms of the pillars. In this way, a fixing method based on bolted connection is replaced, assembly and disassembly are easy, and labor and time are saved.

Further, mounting bases are disposed on the side plates, elastic clamping blocks are disposed on the mounting bases, mounting through-grooves and limiting holes are formed in the rack, the mounting through-grooves are communicated with the limiting holes, the mounting bases correspond to the mounting through-grooves, and the limiting holes correspond to the elastic clamping blocks. The mounting bases are inserted into the mounting through-grooves, and the elastic clamping blocks are squeezed by walls of the mounting through-grooves to deform to enter the mounting grooves; and when the elastic clamping blocks encounter the limiting holes, the elastic clamping blocks restore under the action of counterforce generated by the elastic clamping blocks, and disengage from the limiting holes, such that the mounting bases are prevented from sliding out of the mounting through-grooves at will, the side plates will not be separated from the rack, and limited connection is realized. In this way, a fixing manner based on bolted connection is replaced, assembly and disassembly are easy, and labor and time are saved.

Further, each of the elastic clamping blocks comprises an elastic part and a protruding part disposed on the elastic part, the limiting holes correspond to the protruding parts, and receiving grooves allowing the elastic part to move therein are formed in the mounting bases. When the side plates need to be disassembled, the protruding parts are pressed to force the elastic parts to retreat into the receiving grooves, and the protruding parts disengage from the limiting holes and are shifted outwards, such that the side plates are detached quickly, and operation is easy.

Further, anti-slip pads are disposed at bottoms of the table bases, such that the anti-slip performance of the table bases is improved, and the table frame can be placed stably and is unlikely to slide at will. Anti-slip protrusions are circumferentially distributed on bottoms of the anti-slip pads, such that the degree of roughness of the anti-slip pads is improved, and the anti-slip effect is improved.

Further, studs are disposed on the anti-slip pads, and screw holes corresponding to the studs are formed in bottom surfaces of the table bases. The table frame can be installed reliably, is unlikely to come loose and easy to disassemble and change, can be assembled when used, and is flexible and convenient to use.

By adopting the above technical solution, the invention has the following beneficial effects:

In the invention, the mounting blocks and the control members are disposed in the drive boxes, the control members stretch out of the drive boxes, the mounting grooves are correspondingly formed in the rack, and when the rack and the pillars are assembled, the control members control the mounting blocks to be limited in the mounting grooves, such that the rack and the drive boxes are fixedly connected, the drive boxes and the pillars are fixedly connected, and thus, the pillars and the rack are fixedly connected.

1. The pillars and the rack can be detached; during assembly, the guide pins are placed in the guide grooves and controlled to slide into the bottoms of the guide grooves, such that the guide pins are limited in the guide grooves; then, the positioning pins are placed in the positioning grooves, and the mounting blocks are limited in the mounting grooves, such that the drive boxes are fixed on the rack; and during disassembly, the drive handles control the mounting blocks to rotate, such that the mounting blocks on the two sides of the rotary shafts are synchronously separated from the limiting blocks, the mounting blocks are taken out of the mounting grooves, the positioning pins are taken out of the positioning grooves, and finally, the guide pins are taken out of the guide grooves, such that the drive boxes are detached from the rack. In this way, a fixing method based on bolted connection is replaced, assembly and disassembly are easy, and labor and time are saved.

2. The pillars and the table bases can be detached; during assembly, the limiting pins penetrate through the fixing through-holes and the hook blocks penetrate through the limiting through-holes; then, handles of the hasps are rotated backwards to allow hasp rings to sleeve the limiting pins, and then the hasp rings pull the limiting pins upwards in the horizontal direction to make the hook blocks hook bottom surfaces of the table bases, such that the limiting pins cannot disengage from the fixing through-holes at will in the vertical direction, and the table bases are limited at the bottoms of the pillars. In this way, a fixing method based on bolted connection is replaced, assembly and disassembly are easy, and labor and time are saved.

3. The side plates and the rack can be detached; during assembly, the mounting bases are inserted into the mounting through-grooves, and the elastic clamping blocks are squeezed by walls of the mounting through-grooves to deform to enter the mounting grooves; when the elastic clamping blocks encounter the limiting holes, the elastic clamping blocks restore under the action of counterforce generated by the elastic clamping blocks, and disengage from the limiting holes, such that the mounting bases are prevented from sliding out of the mounting through-grooves at will, the side plates will not be separated from the rack, and limited connection is realized; and during disassembly, the protruding parts are pressed to force the elastic parts to retreat into the receiving grooves, and the protruding parts disengage from the limiting holes and are shifted outwards, such that the side plates are detached quickly. In this way, a fixing manner based on bolted connection is replaced, assembly and disassembly are easy, and labor and time are saved.

BRIEF DESCRIPTION OF THE SEVERAL
VIEWS OF THE DRAWINGS

The invention will be further described below in conjunction with accompanying drawings.

In the figures: 1, pillar; 2, drive box; 3, table base; 4, rack; 5, side plate; 6, mounting block; 7, mounting groove; 8, drive handle; 9, mounting frame; 10, rotary shaft; 11, limiting block; 12, connecting pole; 13, spring; 14, hook groove; 15, connecting hole; 16, positioning pin; 17, guide pin; 18, positioning groove; 19, guide groove; 20, hook block; 21, limiting through-hole; 22, limiting assembly; 23, hasp; 24, limiting pin; 25, fixing through-hole; 26, mounting base; 27, elastic clamping block; 28, mounting through-groove; 29, limiting hole; 30, elastic part; 31, protruding part; 32, receiving groove; 33, anti-slip pad; 34, stud; 35, screw hole; 36, handle; 37, hasp ring; 38, anti-slip protrusion.

DETAILED DESCRIPTION OF THE INVENTION

Figure 1:
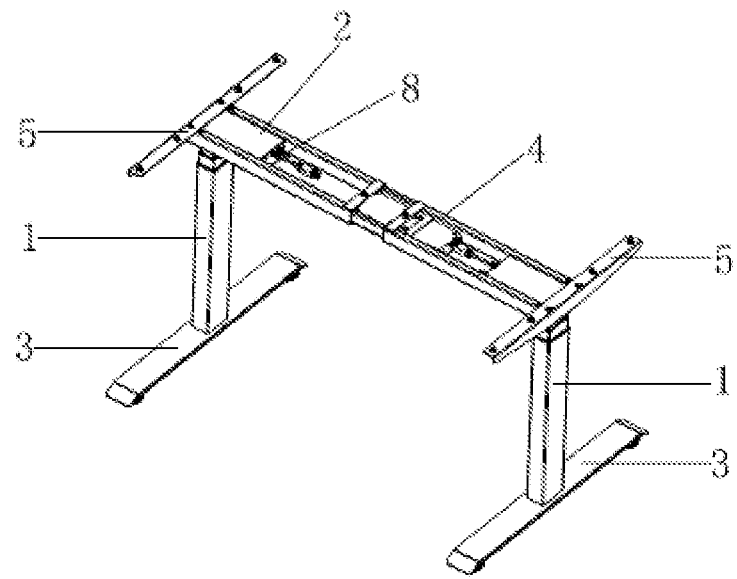
FIG. 1 is a structural view of a quick-assembly table frame according to the invention.
Figure 2:
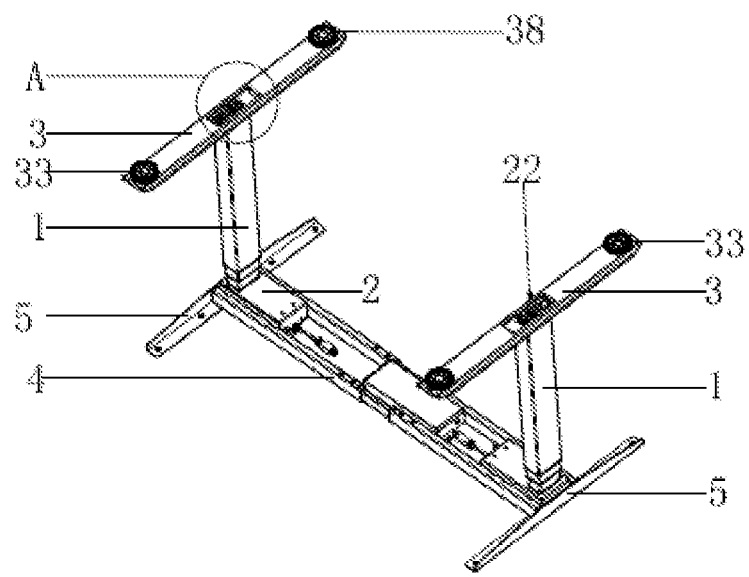
FIG. 2 is a structural view of the bottom of the table frame according to the invention.
Figure 3:
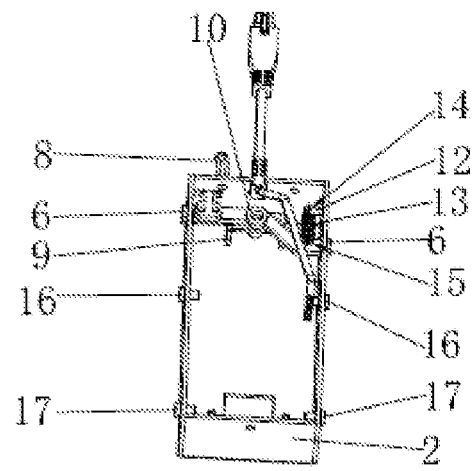
FIG. 3 is a structural view of the interior of a drive box according to the invention.
Figure 4:
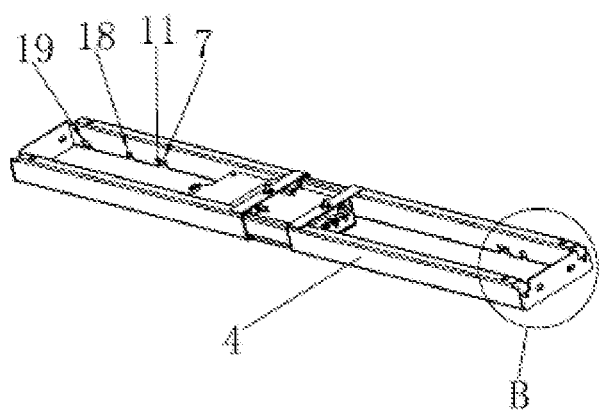
FIG. 4 is a structural view of a rack according to the invention.
Figure 5:
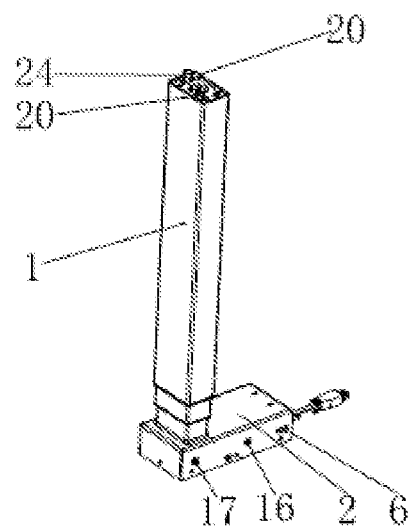
FIG. 5 is a structural view of the bottom of a pillar according to the invention.
Figure 6:
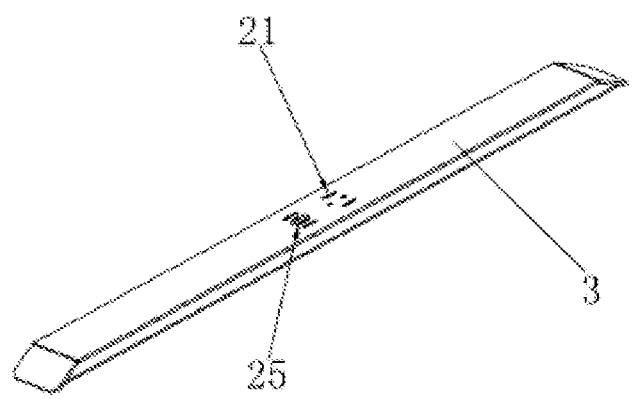
FIG. 6 is a structural view of a table base according to the invention.
Figure 7:
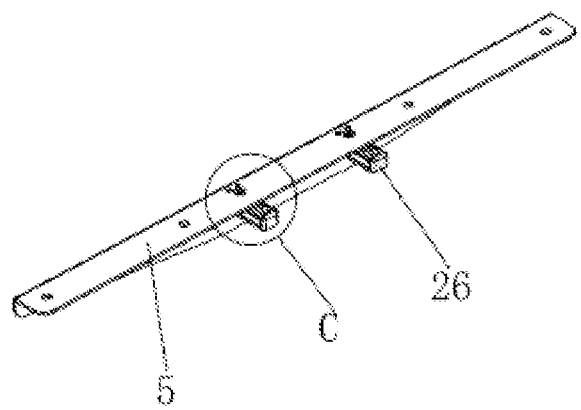
FIG. 7 is a structural view of a side plate according to the invention.
Figure 8:
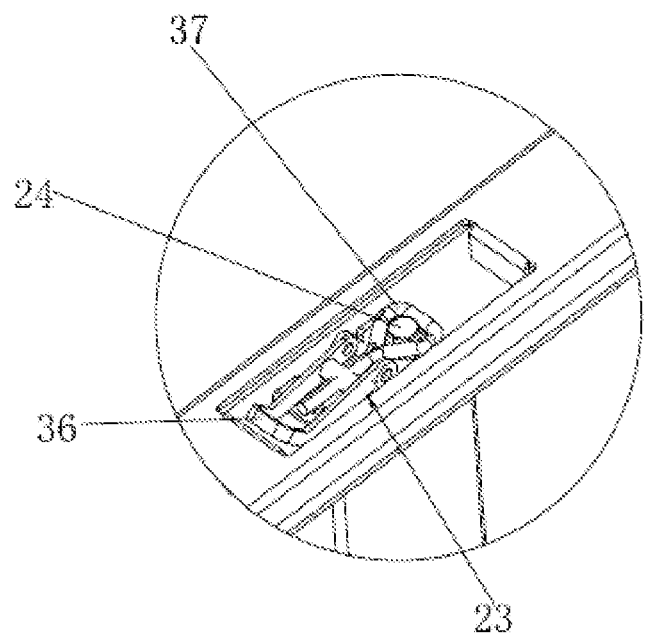
FIG. 8 is an enlarged structural view of A in FIG. 2.
Figure 9:
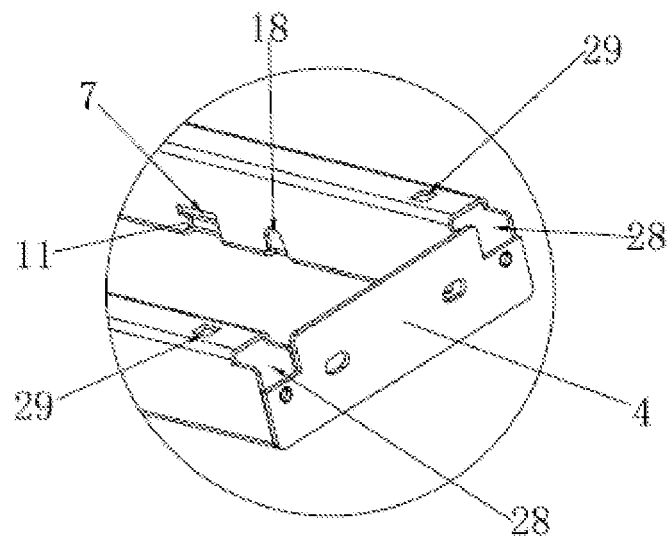
FIG. 9 is an enlarged structural view of B in FIG. 4.
Figure 10:
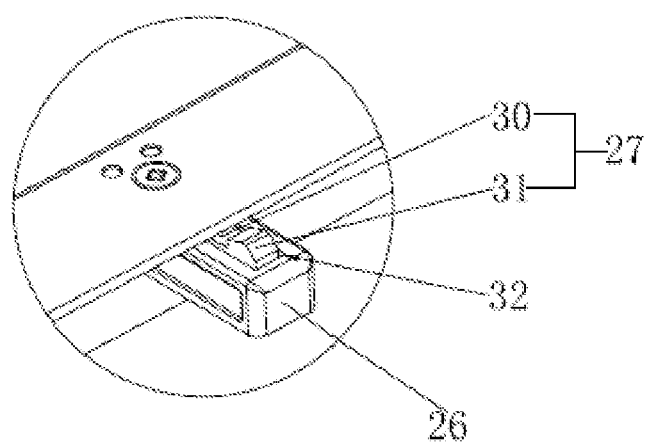
FIG. 10 is an enlarged structural view of C in FIG. 7.

As shown in FIG. 1-FIG. 10, the invention provides a quick-assembly table frame, which comprises pillars 1, drive boxes 2 being disposed at tops of the pillars 1, and table bases 3 being connected to bottoms of the pillars 1; a rack 4 connected to the drive boxes 2; and side plates 5 connected to two sides of the rack 4 and configured to install a table board; wherein, mounting blocks 6 are disposed on two sides of the interior of each of the drive boxes 2, mounting grooves 7 are correspondingly formed in an inner side of the rack 4, control members are disposed in the drive boxes 2, and the control members control the mounting blocks 6 to rotate to be limited in the mounting grooves 7, such that the pillars 1 are detachably connected to the rack 4.

The control members adopt drive handles 8, the drive boxes 2 are fixedly connected to mounting frames 9, the mounting frames 9 are rotatably connected to rotary shafts 10, the mounting blocks 6 are fixedly connected to two sides of the rotary shafts 10 respectively, one end of each of the drive handles 8 is fixedly connected to the mounting block 6 on one side of the corresponding rotary shaft 10, the other end of each of the drive handles 8 penetrates through the corresponding drive box 2, limiting blocks 11 matched with the mounting blocks 6 are disposed in the mounting grooves 7, and the mounting blocks 6 on the two sides of the rotary shafts 10 are controlled to swing by rotating the drive handles 8, and cooperate with the limiting blocks 11 to detachably connect the drive boxes 2 to the rack 4. The drive handles 8 control the mounting blocks on one side of the rotary shafts 10 to rotate and drive the mounting blocks 6 on the other side of the rotary shafts 10 to rotate through the rotary shafts, the limiting blocks 11 disposed in the two mounting grooves 7 are opposite in direction, and when each of the drive handles 8 drives the two corresponding mounting blocks 6 to rotate, the two corresponding mounting blocks 6 rotate in opposite directions, such that the two corresponding mounting blocks 6 are separated from the corresponding limiting blocks 11 or limited in the corresponding mounting grooves 7 at the same time. Connecting poles 12 are disposed in the drive boxes 2, springs 13 are connected between the connecting poles 12 and the mounting blocks 6 on the other side of the rotary shafts 10, hook grooves 14 are formed in ends of the connecting poles 12, connecting holes 15 are formed in the mounting blocks 6 on the other side of the rotary shafts 10, one end of each of the springs 13 is hooked in the corresponding hook groove 14, and the other end of each of the springs 13 is hooked in the corresponding connecting hole 15. Through the arrangement of the springs 13, the mounting blocks 6 can return automatically under the action of the spring 13 after being controlled by the drive handles 8 to rotate. Positioning pins 16 and guide pins 17 are disposed on two sides of the drive boxes 2 respectively, the positioning pins 16 are located between the mounting blocks 6 and the guide pins 17, positioning grooves 18 are formed in the inner side of the rack 4 corresponding to the positioning pins 16, guide grooves 19 are formed in the inner side of the rack 4 corresponding to the guide pins 17, and the guide grooves 19 are arc-shaped grooves which incline downwards, away from the positioning grooves 18. In the assembly process of the drive boxes 2, the guide pins 17 are placed in the guide grooves 19 and controlled to slide into bottoms of the guide grooves 19, such that the guide pins 17 are limited in the guide grooves 19; then, the positioning pins 16 are placed in the positioning grooves 18, and the mounting blocks 6 are limited in the mounting grooves 7, such that the drive boxes 2 are fixed on the rack 4. When drive boxes 2 need to be disassembled, the drive handles 8 control the mounting blocks 6 to rotate, such that the mounting blocks 6 on the two sides of the rotary shafts 10 are synchronously separated from the limiting blocks 11, the mounting blocks 6 are taken out of the mounting grooves 7, the positioning pins 16 are taken out of the positioning grooves 18, and finally, the guide pins 17 are taken out of the guide grooves 19, such that the drive boxes 2 are detached from the rack 4.

Hook blocks 20 are disposed at bottoms of the pillars 1, limiting through-holes 21 allowing the hook blocks 20 to penetrate therethrough are formed in the table bases 3, limiting assemblies 22 are disposed between the pillars 1 and the table bases 3, and the limiting assemblies 22 are used for restraining the hook blocks 20 from disengaging from the limiting through-holes 21 at will. Each of the limiting assemblies 22 comprises a hasp 23 and a limiting pin 24, wherein the hasp 23 is disposed at the bottom of the corresponding table base 3, and the limiting pin 24 is disposed at the bottom of the corresponding pillar 1. Fixing through-holes 25 allowing the limiting pins 24 to penetrate therethrough are formed in the table bases 3. During assembly, the limiting pins 24 penetrate through the fixing through-holes 25 and the hook blocks 20 penetrate through the limiting through-holes 21; then, handles of the hasps 23 are rotated backwards to allow hasp rings to sleeve the limiting pins 24, and then the hasp rings pull the limiting pins 24 upwards in the horizontal direction to make the hook blocks 20 hook bottom surfaces of the table bases 3, such that the limiting pins 24 cannot disengage from the fixing through-holes 25 at will in the vertical direction, and the table bases 3 are limited at the bottoms of the pillars 1. In this way, a fixing method based on bolted connection is replaced, assembly and disassembly are easy, and labor and time are saved.

Mounting bases 26 are disposed on the side plates 5, elastic clamping blocks 27 are disposed on the mounting bases 26, mounting through-grooves 28 and limiting holes 29 are formed in the rack 4, the mounting through-grooves 28 are communicated with the limiting holes 29, the mounting bases 26 correspond to the mounting through-grooves 28, and the limiting holes 29 correspond to the elastic clamping blocks 27. The mounting bases 26 are inserted into the mounting through-grooves 28, and the elastic clamping blocks 27 are squeezed by walls of the mounting through-grooves 26 to deform to enter the mounting grooves 28; and when the elastic clamping blocks 27 encounter the limiting holes 29, the elastic clamping blocks 27 restore under the action of counterforce generated by the elastic clamping blocks 27, and disengage from the limiting holes 29, such that the mounting bases 26 are prevented from sliding out of the mounting through-grooves 28 at will, the side plates 5 will not be separated from the rack 4, and limited connection is realized. In this way, a fixing manner based on bolted connection is replaced, assembly and disassembly are easy, and labor and time are saved. Each of the elastic clamping blocks 27 comprises an elastic part 30 and a protruding part 31 disposed on the elastic part 30. The limiting holes 29 correspond to the protruding parts 31, and receiving grooves 32 allowing the elastic parts 30 to move therein are formed in the mounting bases 26. When the side plates 5 need to be disassembled, the protruding parts 31 are pressed to force the elastic parts 30 to retreat into the receiving grooves 32, and the protruding parts 31 disengage from the limiting holes 29 and are shifted outwards, such that the side plates 5 are detached quickly, and operation is easy.

Anti-slip pads 33 are disposed at the bottoms of the table bases 3, such that the anti-slip performance of the table bases 3 is improved, and the table frame can be placed stably and is unlikely to slide at will. Anti-slip protrusions 38 are circumferentially distributed on bottoms of the anti-slip pads 33, such that the degree of roughness of the anti-slip pads 33 is improved, and the anti-slip effect is improved. Studs are disposed on the anti-slip pads 33, and screw holes corresponding to the studs are formed in bottom surfaces of the table bases 3. The table frame can be installed reliably, is unlikely to come loose and easy to disassemble and change, can be assembled when used, and is flexible and convenient to use.

In the invention, the mounting blocks 6 and the control members are disposed in the drive boxes 2, the control members stretch out of the drive boxes 2, the mounting grooves 7 are correspondingly formed in the rack 4, and when the rack 4 and the pillars 1 are assembled, the control members control the mounting blocks 6 to be limited in the mounting grooves 7, such that the rack 4 and the drive boxes 2 are fixedly connected, the drive boxes 2 and the pillars 1 are fixedly connected, and thus, the pillars 1 and the rack 4 are fixedly connected.

The above embodiments are merely specific ones of the invention, and the technical features of the invention are not limited to the above embodiments. Any simple transformations, equivalent substitutions or modifications made for solving basically the same technical problems and fulfilling basically the same technical effects based on the invention should fall within the protection scope of the invention.

What is claimed is:

1. A quick-assembly table frame, comprising:
    pillars, drive boxes being disposed at tops of the pillars, and table bases being connected to bottoms of the pillars;
    a rack connected to the drive boxes; and
    side plates connected to two sides of the rack and configured to install a table board;
    wherein:
    mounting blocks are disposed in the drive boxes, mounting grooves are correspondingly formed in an inner side of the rack, control members are disposed in the drive boxes, and the control members control the mounting blocks to rotate to be limited in the mounting grooves, such that the pillars are detachably connected to the rack.

2. The quick-assembly table frame according to claim 1, wherein positioning pins and guide pins are disposed on two sides of the drive boxes respectively, the positioning pins are located between the mounting blocks and the guide pins, positioning grooves are formed in the inner side of the rack corresponding to the positioning pins, guide grooves are formed in the inner side of the rack corresponding to the guide pins, and the guide grooves are arc-shaped grooves which incline downwards, away from the positioning grooves.

3. The quick-assembly table frame according to claim 1, wherein hook blocks are disposed at the bottoms of the pillars, limiting through-holes allowing the hook blocks to penetrate therethrough are formed in the table bases, limiting assemblies are disposed between the pillars and the table bases, and the limiting assemblies are used for restraining the hook blocks from designating from the limiting through-holes at will.

4. The quick-assembly table frame according to claim 3, wherein each of the limiting assemblies comprises a hasp disposed at a bottom of the corresponding table base and a limiting pin disposed at the bottom of the corresponding pillar, and fixing through-holes allowing the limiting pins to penetrate therethrough are formed in the table bases.

5. The quick-assembly table frame according to claim 1, wherein mounting bases are disposed on the side plates, elastic clamping blocks are disposed on the mounting bases, mounting through-grooves and limiting holes are formed in the rack, the mounting through-grooves are communicated with the limiting holes, the mounting bases correspond to the mounting through-grooves, and the limiting holes correspond to the elastic clamping blocks.

6. The quick-assembly table frame according to claim 5, wherein each of the elastic clamping blocks comprises an elastic part and a protruding part disposed on the elastic part, the limiting holes correspond to the protruding parts, and receiving grooves allowing the elastic part to move therein are formed in the mounting bases.

7. The quick-assembly table frame according to claim 1, wherein anti-slip pads are disposed at bottoms of the table bases.

8. The quick-assembly table frame according to claim 7, wherein studs are disposed on the anti-slip pads, and screw holes corresponding to the studs are formed in bottom surfaces of the table bases.

\* \* \* \* \*